(12) United States Patent
Fukawa et al.

(10) Patent No.: US 6,328,650 B1
(45) Date of Patent: Dec. 11, 2001

(54) GAME CONTROLLER AND INFORMATION STORAGE MEDIUM

(75) Inventors: Takashi Fukawa, Yokohama; Masatoshi Takai, Nakano-ku, both of (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/077,971

(22) PCT Filed: Oct. 15, 1997

(86) PCT No.: PCT/JP97/03709

§ 371 Date: Jul. 10, 1998

§ 102(e) Date: Jul. 10, 1998

(87) PCT Pub. No.: WO98/17361

PCT Pub. Date: Apr. 30, 1998

(30) Foreign Application Priority Data

Oct. 17, 1996 (JP) .................................................. 8-297106

(51) Int. Cl.[7] ........................................................ A63F 9/24
(52) U.S. Cl. ............................. 463/36; 463/37; 273/148 B
(58) Field of Search .................................. 463/36, 37, 5, 463/49, 50, 51, 52; 124/1; 273/148 B

(56) References Cited

U.S. PATENT DOCUMENTS

| | | |
|---|---|---|
| 4,268,036 * | 5/1981 | Yokoi ..................................... 463/49 |
| 4,270,755 | 6/1981 | Willhide et al. . |
| 4,600,200 | 7/1986 | Oka et al. . |
| 5,190,286 | 3/1993 | Watanabe et al. . |
| 5,212,368 | 5/1993 | Hara . |
| 5,229,756 | 7/1993 | Kosugi et al. . |
| 5,351,969 | 10/1994 | Smith, III et al. . |
| 5,569,085 * | 10/1996 | Igarashi et al. ......................... 463/49 |
| 5,577,962 * | 11/1996 | Kounoe et al. ......................... 463/49 |
| 5,734,807 * | 3/1998 | Sumi ..................................... 463/32 |
| 5,785,592 * | 7/1998 | Jacobsen ................................ 463/25 |

FOREIGN PATENT DOCUMENTS

| | | |
|---|---|---|
| 60-96282 | 5/1985 | (JP) . |
| 62-49881 | 3/1987 | (JP) . |
| 8-117437 | 5/1996 | (JP) . |
| 8-117447 | 5/1996 | (JP) . |
| 8-117448 | 5/1996 | (JP) . |

* cited by examiner

*Primary Examiner*—Sheila Clayton
(74) *Attorney, Agent, or Firm*—Oliff & Berridge, PLC

(57) ABSTRACT

The objective of this invention is to provide a game controller capable of using synchronizing signals to obtain accurate coordinates of an indicated position. Cables (22) and (24) transfer a video signal from a video output terminal of a main game machine unit and a control signal to a controller terminal. An HV separator (150) separates vertical and horizontal synchronizing signals from the video signal. Light from an aimed-at position is detected by a photosensor (154) provided within a gun (20), and a position computation section (162) obtains the coordinates of the aimed-at position, based on a detection pulse at that point and synchronizing signals from the HV separator (150). The cable (22) is connected to the cable (24) within a connector (36) so that a video signal and control signals are transferred by the cable (24). The video output terminal is connected to a video input terminal and a second game controller by using a connector (30) having male and female terminals (32) and (34). The HV separator (150) could be provided within the gun (20) or within the connector (36).

16 Claims, 14 Drawing Sheets

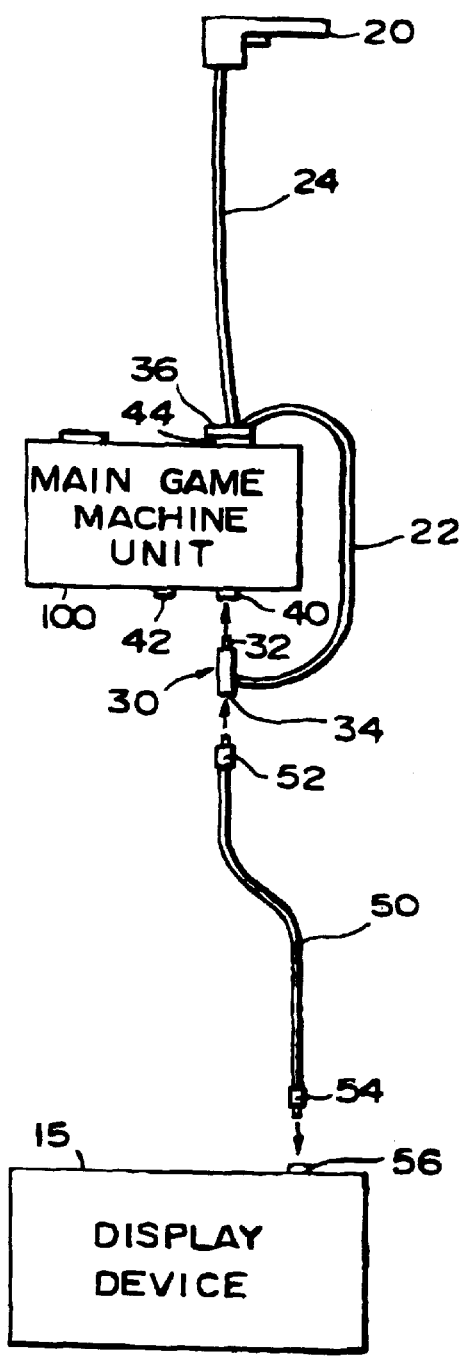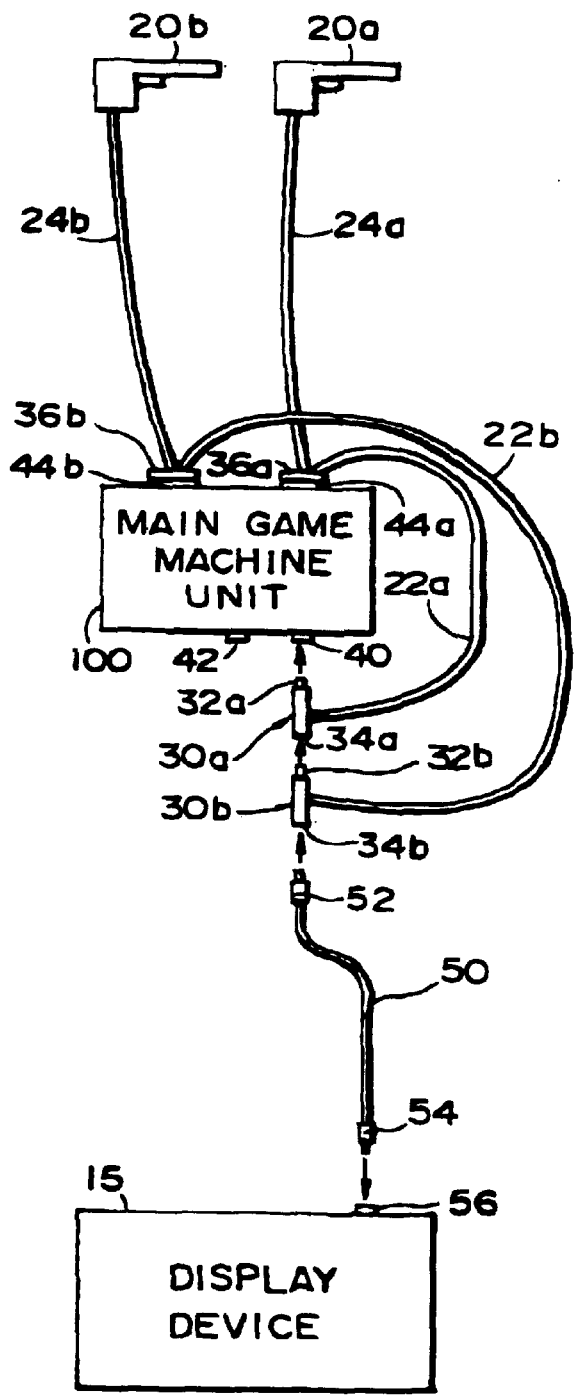

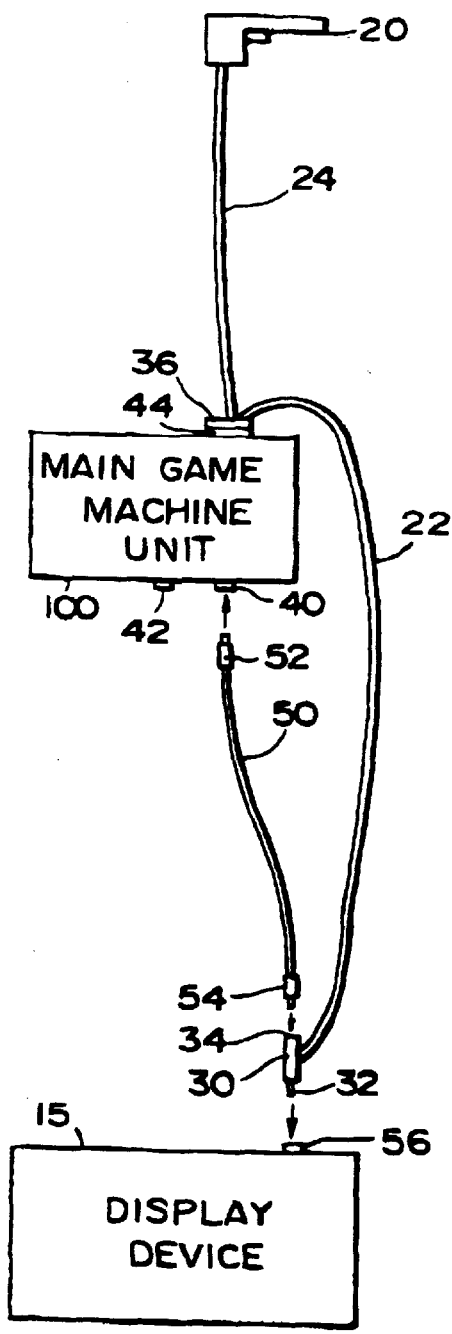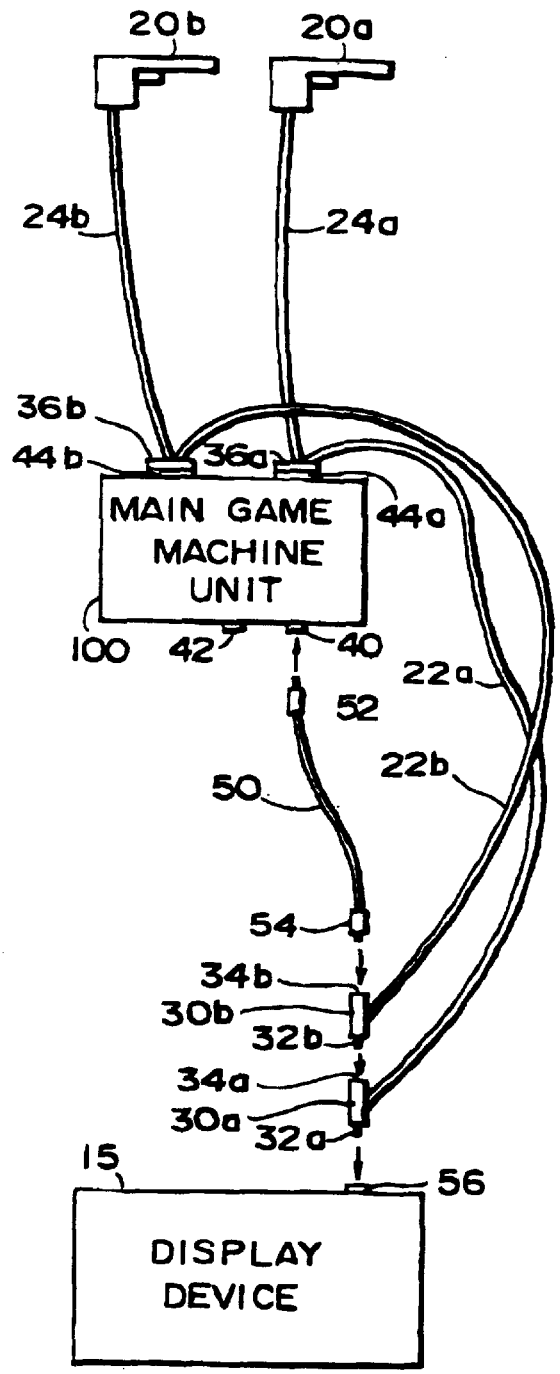

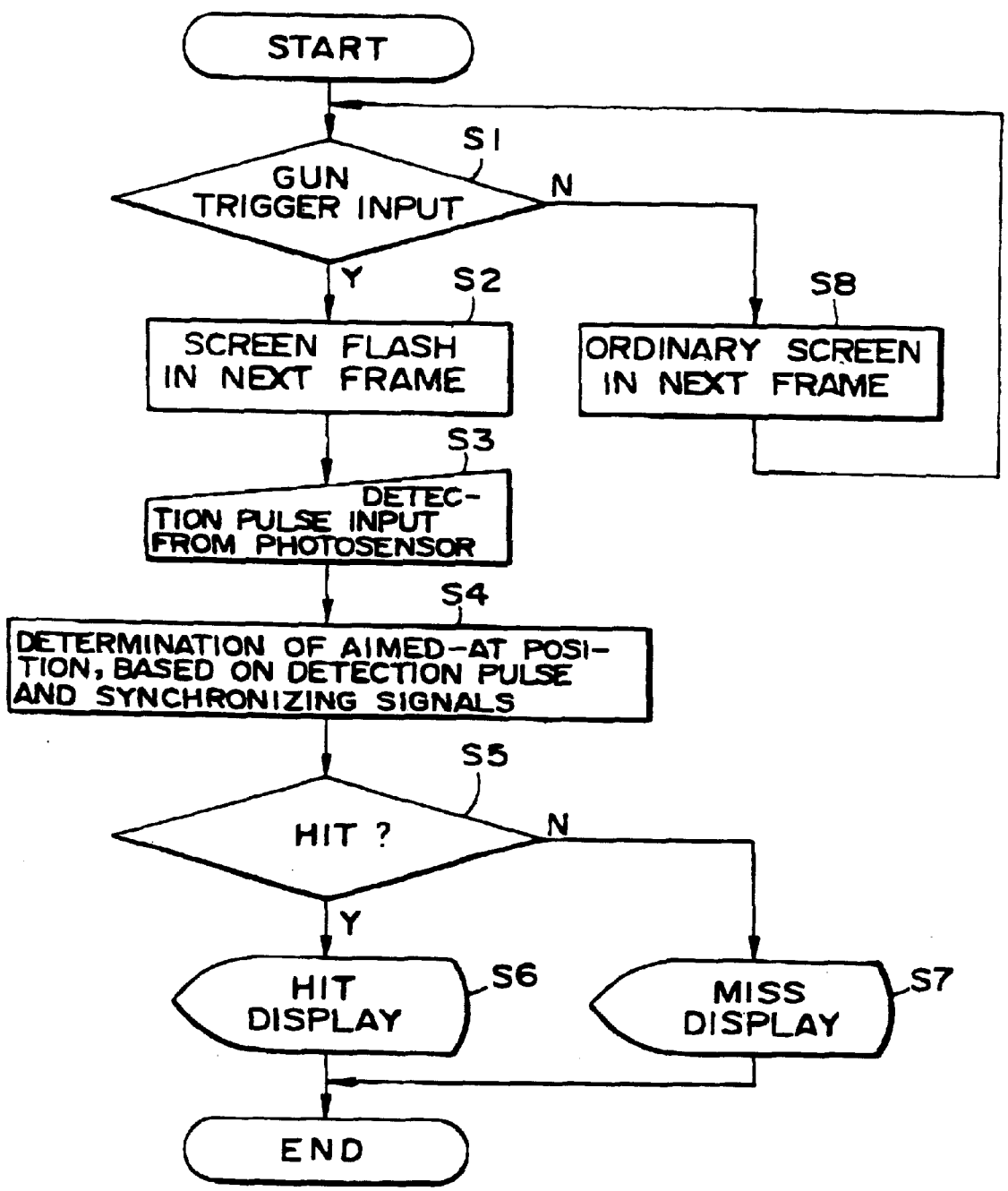

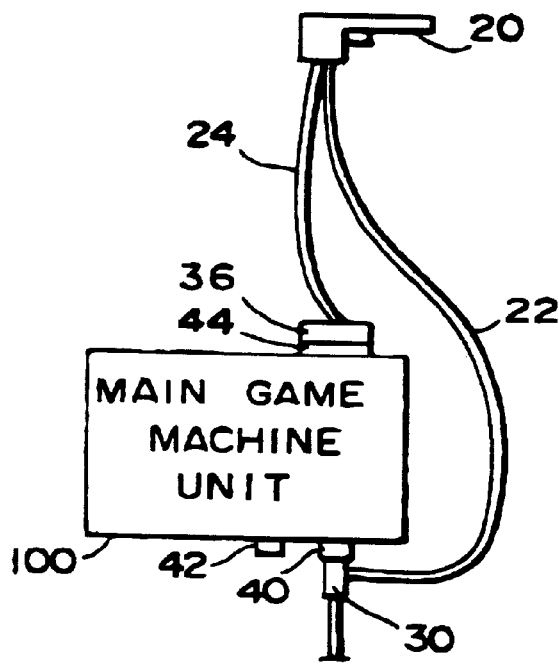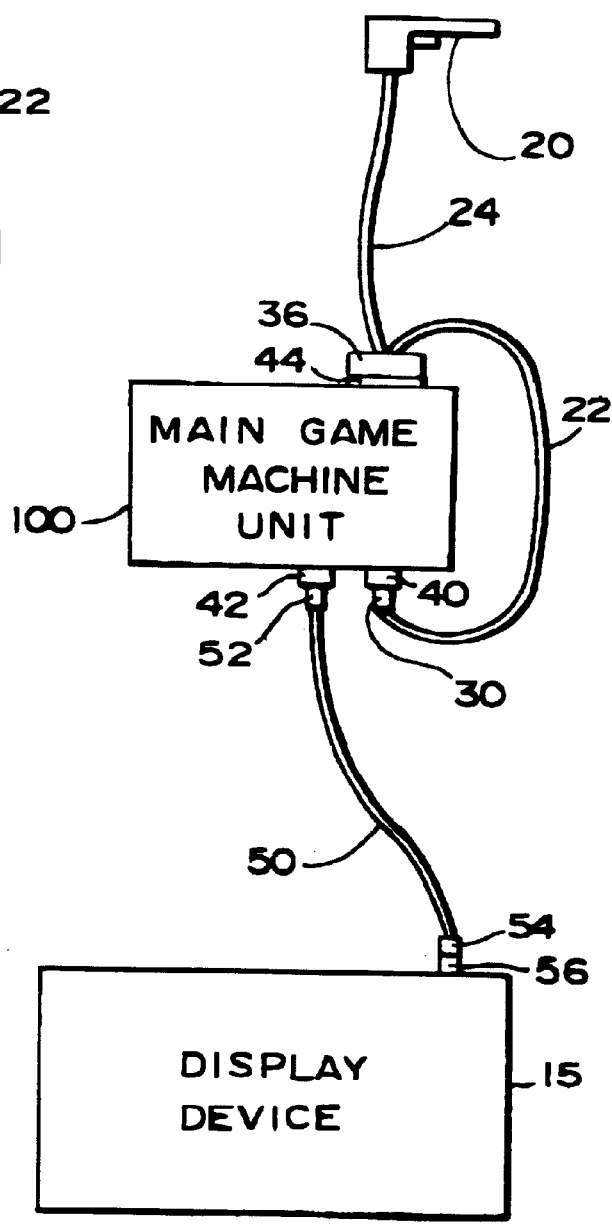

GAME CONTROLLER AND INFORMATION STORAGE MEDIUM

TECHNICAL FIELD

This invention relates to a game controller and an information storage medium that make it possible to obtain the coordinates of any indicated position on a screen.

BACKGROUND ART

A game machine that is known in the art and is gaining popularity enables a player to use a game controller in the shape of a gun or the like, to shoot at targets on a screen. In this type of game machine, targets that are displayed on the screen are shot at without actually firing bullets from the gun. Therefore, how to accurately detect the aimed-at position during this shooting is an important technical concern. Various techniques are known in the art for detecting this aimed-at position accurately, such as those disclosed in Japanese Patent Application Laid-Open Nos. 8-117447 and 8-117448.

However, if this type of shooting game is to be implemented in a domestic game machine, for example, the problems described below occur. In other words, a domestic game machine usually has only a small number of external output terminals, so that position detection by means such as a synchronizing signal is difficult, and thus the problem occurs that the detection of the aimed-at position is not accurate. Methods have been considered for correcting the detected position by software means, but it is not possible to ensure the same level of detection accuracy as that of an arcade type of game machine with any of these methods. A further problem occurs if it becomes too complicated to drag the cable of the game controller around, obstructing the player.

This invention was devised in order to solve the above technical problems, and has as an objective thereof the provision of a game controller and an information storage medium that make it possible to obtain accurate coordinates of an indicated position by utilizing a synchronizing signal.

DISCLOSURE OF THE INVENTION

In order to solve the above described problems, according to a first aspect of this invention, there is provided a game controller used in a game machine having a first terminal for outputting a video signal and a second terminal to which a control signal is input, the game controller comprising: a first cable for transferring the video signal that is output from the first terminal; a second cable for transferring the control signal that is input to the second terminal; a separation means for separating a synchronizing signal from the video signal; a pointing body capable of being directed in any desired direction; an optical detection means provided in the pointing body, for detecting light from a position indicated by the pointing body on a screen of a display device; and position computation means for obtaining the coordinates of the indicated position, based on outputs from the separation means and the optical detection means.

With this aspect of the invention, a video signal that has been output from the first terminal is input to the separation means, and synchronizing signals such as horizontal and vertical synchronizing signals are separated from that video signal. The coordinates of an indicated position, such as an aimed-at position, are obtained from these synchronizing signals and an output from the optical detection means. This aspect of the invention makes it possible to obtain the coordinates of an indicated position accurately, because the synchronizing signals are used in the coordinate calculations. Since the synchronizing signals are generated and computated by separation of the video signal, the calculation of the coordinates of the indicated position can be done with time to spare, unlike with methods of coordinate calculations involving interrupt processing in the CPU, for instance. This also enables accurate coordinate calculations in a game machine in which synchronizing signals are not output from the first terminal. Note that the second terminal could be such that at least a control signal can be input thereto, or it could be an input-output terminal capable of outputting a given signal.

The first cable may transfer the video signal from the first terminal to the second cable, and the second cable may transfer the control signal input to the second terminal and the video signal received from the first cable.

This configuration makes it possible to reduce the cabling connected to the pointing body, such as a gun, to one cable. This makes it possible to prevent the complication of dragging cables around, making it more convenient for the player.

The game controller may further comprise a connector connected to the first cable, wherein the connector comprises:

a third terminal formed to be connectable to the first terminal either directly or via a given cable, for transferring the video signal from the first terminal to the first cable; and a fourth terminal formed to be connectable to a video input terminal of the display device or one of the terminals of a connector of a second game controller, either directly or via a given cable, for transferring the video signal transferred from the first terminal through the third terminal to the video input terminal or the one of the terminals of the connector of the second game controller.

The third terminal of the connector can be connected to the first terminal of the game machine and the fourth terminal of the connector can be connected by a given cable to the video input terminal of the display device. Alternatively, one of the terminals of the connector of a second game controller (the third terminal of the connector of the second game controller) could be connected to the fourth terminal, with the other terminal thereof (the fourth terminal of the connector of the second game controller) being connected by a given cable to the video input terminal. This configuration ensures that the video signal from the first terminal can be transferred to the game controller, a second game controller, and the display device, without forcing the player to use complicated wiring that differs from the usual setup.

The separation means may be provided within the pointing body.

This makes it possible to calculate the coordinates accurately while keeping the game controller compact.

Note that the separation means could be provided either in a connector linking the first cable to the first terminal or in a connector linking the second cable to the second terminal.

According to a second aspect of this invention, there is provided an information storage medium comprising information used for operating a game machine that uses any of the above described game controllers, wherein the information comprises: information for performing game computations, based on coordinates of an indicated position that are obtained by the game controller; and information for synthesizing an image to be displayed on the display device, based on results of the game computations.

This aspect of the invention makes it possible to perform game calculations such as those for determining whether a target has been hit and those for game sequences corresponding to the result of that determination, using a game controller that is capable of accurately calculating the coordinates of an indicated position. It is therefore possible to present a game which is extremely realistic and which further heightens the player's enthusiasm.

BRIEF DESCRIPTION OF DRAWINGS

FIGS. 2A and 2B show examples of game controller connections.

FIGS. 3A and 3B show further examples of game controller connections.

FIG. 6 is a flowchart illustrating an example of the determination of the aimed-at position.

FIGS. 14A and 14B show different embodiments relating to cable connections.

BEST MODE FOR CARRYING OUT THE INVENTION

Preferred embodiments of this invention are described below, with reference to the accompanying drawings.

Figure 1:
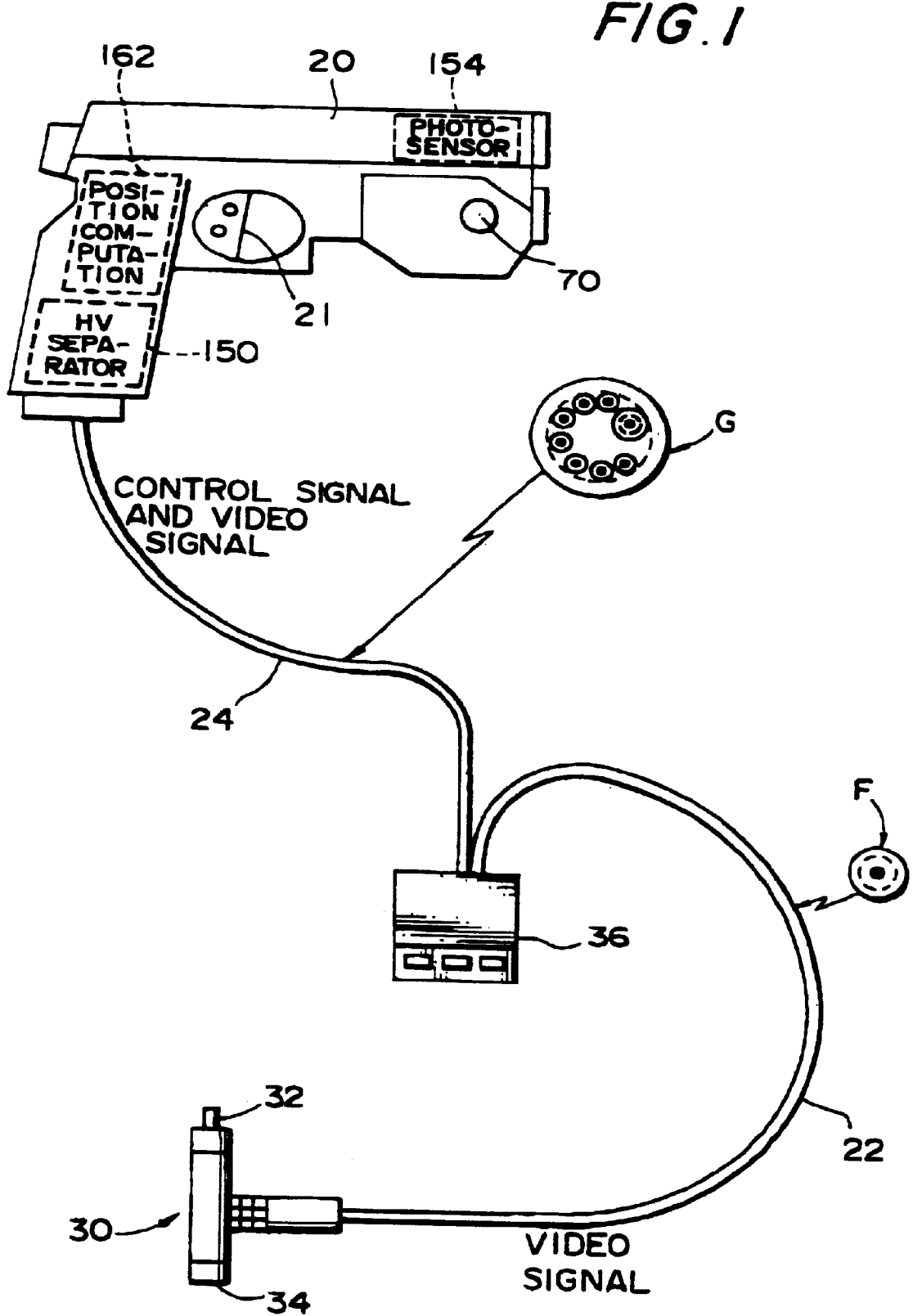
FIG. 1 shows an example of the configuration of a game controller in accordance with this invention.

An example of a game controller in accordance with this invention is shown in FIG. 1.

The configuration is such that a player grasps a gun 20 (a pointing body) in one or both hands and points it in any desired direction.

A cable 22 (a first cable) transfers a video signal that is output from a video output terminal 40 (a first terminal) of a main unit 100 of the game machine, as shown in FIG. 2A. More specifically, a connector 30 connected to one end of the cable 22 is capable of transferring a video signal by being connected to the video output terminal 40. Note that, if the main unit 100 of the game machine also has a second video output terminal 42, the connector 30 could equally well be connected to that second video output terminal 42.

Another cable 24 (a second cable) transfers a control signal that is input to a controller terminal 44 (a second terminal) of the main unit 100 of the game machine. More specifically, a connector 36 that is connected to the other end of the cable 22 and one end of the cable 24 can transfer a control signal when it is connected to the controller terminal 44. This cable 24 also transfers a video signal that is transferred from the cable 22. Note that the controller terminal 44 of this embodiment acts as an input-output terminal.

An HV separator 150 shown in FIG. 1 separates synchronizing signals, such as a horizontal synchronizing signal and a vertical synchronizing signal, from the video signal output from the video output terminal 40. A photosensor 154 detects light from a position indicated by the gun 20 on the screen of the display device, such as a television. A position computation section 162 calculates the coordinates of the position indicated by the gun, based on outputs from the HV separator 150 and the photosensor 154.

A first feature of this embodiment is the way in which the HV separator 150 separates the synchronizing signals, based on the video signal from the video output terminal 40 of the main unit 100 of the game machine, and the position computation section 162 uses these synchronizing signals to calculate the coordinates of the position indicated by the gun.

This use of the synchronizing signals makes it possible to obtain the coordinates of the indicated position extremely accurately. If a method that does not use synchronizing signals is employed, errors on the order of ±10 to 20 mm could occur on a 29-inch monitor, even if corrections are applied by software. There is another problem in that it is not possible to use synchronizing signals to calculate the coordinates of the indicated position in a game machine in which synchronizing signals cannot be extracted from the controller terminal 44.

Since this embodiment separates out the synchronizing signals on the basis of the video signal that is output from the video output terminal 40 and then calculates the coordinates of the indicated position on the basis of these synchronizing signals, it can completely solve the above problem. It also makes it possible to suppress errors to approximately ±1 to 2 mm on a 29-inch monitor, for example.

A second feature of this embodiment is the way in which the cable 22 transfers the video signal output from the video output terminal 40 to the cable 24, and the cable 24 transfers control signals to the controller terminal 44, and also transfers the video signal from the cable 22. In other words, the video signal is transferred by the cable 22, which is coaxial as shown at F in FIG. 1, to the connector 36, and the cable 22 is connected to the cable 24 within the connector 36. The video signal from the cable 22 and control signals are then transferred to the gun 20, which is the pointing body, by the cable 24 which has a configuration such as that shown at G in FIG. 1. This ensures that there is only one cable, the cable 24, between the main unit 100 of the game machine and the gun 20. This means that it is not complicated to drag the cable around, making it more convenient for the player. Note that the configuration of the cable 24 is not limited to that shown at G in FIG. 1; various other configurations could be employed therefor, depending on improvements in noise characteristics, transmission characteristics, and cable thickness thereof.

A third feature of this embodiment is the way in which the connector 30 of the form shown in FIG. 1 is provided at one end of the cable 22. A male terminal 32 (a third terminal) of the connector 30 is formed to be directly connectable to the female video output terminal 40, as shown in FIG. 2A. This makes it possible for the video signal from the video output terminal 40 to be transferred to the cable 22. A female terminal 34 (a fourth terminal) is formed to be connectable to a video input terminal 56 of a display device 15, by a cable 50 that has connectors 52 and 54 (by connecting the connector 52 to the terminal 34). This makes it possible to transfer the video signal from the video output terminal 40 to the video input terminal 56 of the display device 15. This makes it possible for the player to connect the video output terminal 40 to the video input terminal 56 even if the connector 30 is also connected to the video output terminal 40, in the same way as if the connector 30 were not connected to the video output terminal 40. Thus the player is not forced to use complicated wiring that differs from the usual setup, making it more convenient for the player.

Further advantages can be obtained by using the connector 30 of the form shown in FIG. 1, as described below. In other words, it a second game controller 20b is to be connected, a terminal 32a of a connector 30a of the first game controller 20a is first connected to the video output terminal 40, as shown in FIG. 2B. A terminal 32b of a connector 30b of the second game controller 20b is then connected to a terminal 34a of the connector 30a. A terminal 34b of the connector 30b is then connected to the connector 52 of the cable 50, and the connector 54 is connected to the video input terminal 56. Similar wiring can be employed when three or more game controllers are to be connected. In this manner, this embodiment makes it possible to use essentially the same wiring as that when a single game controller is used, even if a plurality of game controller are used, making it more convenient for the player.

Note that the connector 30 is connected to the video output terminal 40 side in FIGS. 2A and 2B, but the connector 30 could equally well be connected to the video input terminal 56 side of the display device 15, as shown in FIGS. 3A and 3B. In such a case, the connector 54 at one end of the cable 52 could be connected to the terminal 34 of the connector 30, with the connector 52 at the other end being connected to the video output terminal 40 In addition, a given cable could be connected between the video output terminal 40 and the terminal 32 (32a) in FIGS. 2A and 2B, for example.

Figure 4:
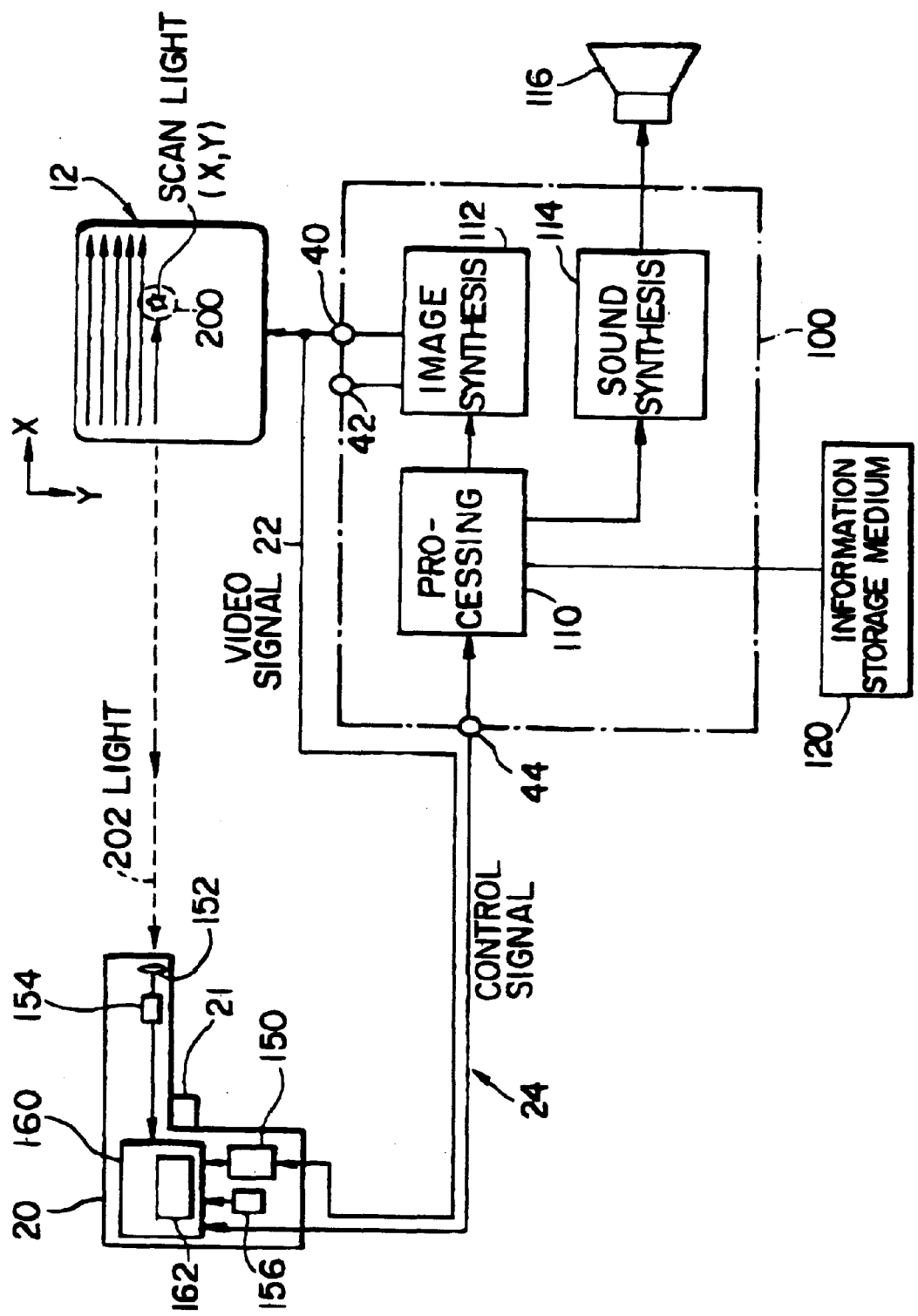
FIG. 4 shows an example of a functional block diagram of a game machine which uses the game controller of this invention

The description now turns to an example of the configuration of a game machine that uses the game controller of this embodiment, with reference to the functional block diagram of FIG. 4.

The main unit 100 of the game machine comprises a processing section 110, an image synthesis section 112, and a sound synthesis section 114. The processing section 110 controls the entire device, moves display objects on the screen, and determines the progress of the game, based on a program and data stored in an information storage medium 120 such as a CD-ROM, game cassette, IC card, magnet-optical (MO) disk, floppy disk, or memory. The functions of this processing section 110 could be implemented by means such as a given program, the CPU, or memory. The image synthesis section 112 processes the synthesis of images displayed on the screen in accordance with directions from the processing section 110, and the functions thereof could be implemented by means such as a given program, a dedicated image synthesis IC, an ordinary digital signal processor (DSP), the CPU, or memory. The sound synthesis section 114 processes the synthesis of game sounds and background sounds in accordance with directions from the processing section 110, and the functions thereof could be implemented by means such as a given program, a dedicated sound synthesis IC, an ordinary DSP, the CPU, or memory.

A lens 152, the photosensor 154, the HV separator 150, a clock generator 156, and a processing section 160 are built into the gun 20, which is a pointing body. This processing section 160 controls the entire game controller, receives instructions from the main unit 100 of the game machine, communicates with the main unit 100 of the game machine, and calculates the coordinates of the indicated position, and the functions thereof could be implemented by means such as a given program, a dedicated IC, the CPU, or memory. As shown in the detailed diagram of FIG. 5 the processing section 160 comprises the position computation section 162 and the position computation section 162 comprises a position determination section 164, an X counter 166, and a Y counter 168.

The description now turns to the operation of this embodiment. In this embodiment, the processing section 110 and the image synthesis section 112 of FIG. 4 create a series of game images that represent targets, based on a given program. The thus created images are shown on a display 12. If the player manipulates a trigger 21 of the gun 20 to shoot at these targets, the aimed-at position thereof is detected by the position computation section 152. If the aimed-at position coincides with the position of a target, it is determined that a bullet has hit, and points corresponding to that target are counted and displayed.

In this case, the gun 20 is formed to be hollow, the lens 152 is at the forward end of the gun 20 and the photosensor 154 is provided in the interior thereof so that light 202 coming from the direction in which the gun 20 is pointing can be detected by the photosensor 154. During this time, a detection area 200 of approximately 5 cm diameter (when the distance-from the gun is approximately 1 m to 1.5 m) is set on the display 12, as shown in FIG. 4. When the raster scan of the display 12 passes through this detection area 200, the photosensor 154 outputs a detection pulse to the processing section 160.

When the player lines up with the target and presses the trigger 21, a flash screen is shown on the display 12. The position computation section 162 obtains the raster scan position when the detection pulse was input, while the flash screen is being displayed. This provides the X and Y coordinates of the aimed-at position (indicated position) on the screen. The processing section 110 within the main unit 100 of the game machine determines whether or not this aimed-at position matches the hit area of the target. The system then does processing for a game sequence indicating a hit or a game sequence indicating a miss, based on the result of this determination.

A flowchart illustrating the operation of this embodiment is shown in FIG. 6. The player first operates a start button provided on the gun 20, to start the game.

It is then determined whether or not a trigger signal has been input from the gun 20 (step S1) and, if it is determined that this trigger signal has not been input, an ordinary game image is displayed on the display 12, even at the next frame (step S8).

If, on the other hand, it is determined that the trigger signal has been input, the screen is flashed at the next frame (step S2). The position computation section 162 then determines the aimed-at position of the bullet from the gun 20, based or a detection pulse that the photosensor 154 outputs during the time that this flash screen is displayed and the horizontal and vertical synchronizing signals that have been separated from the video signal by the HV separator 150 (steps S3 and S4). The X coordinate (horizontal scan position) and Y coordinate (vertical scan position) of this aimed-at position are output from the position computation section 162 to the processing section 110 within the main unit 100 of the game machine.

The processing section 110 determines whether the target has been hit, based on whether or not the X and Y coordinates of the aimed-at position are within the hit area of the target, and shows a corresponding game image on the display (steps S5, S6, and S7).

Figure 5:
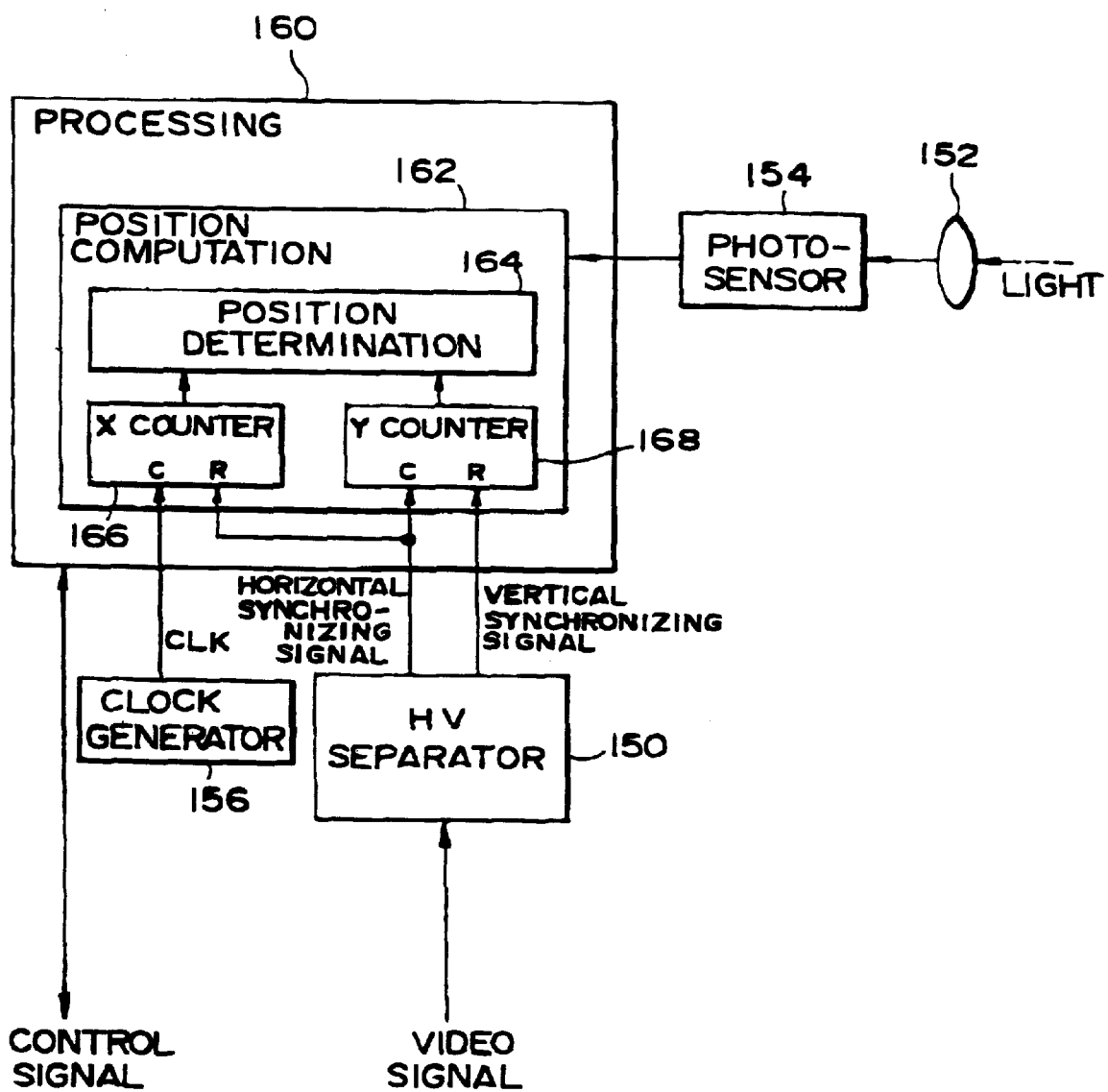
FIG. 5 is a view illustrating details of the processing section.
Figure 7A:
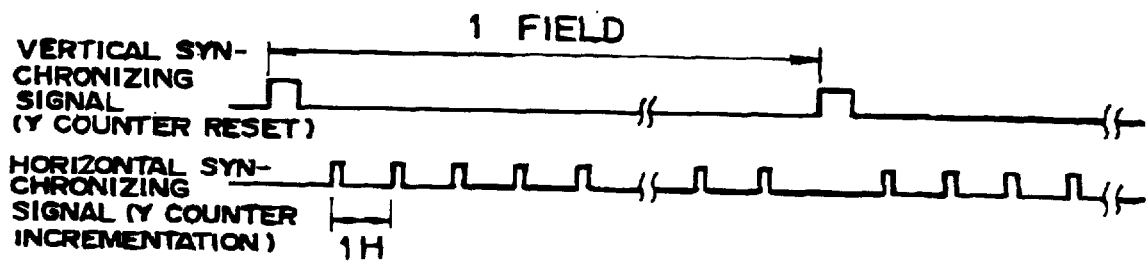
FIGS. 7A, 7B, and 7C are views illustrating the operation of the position computation section.
Figure 7B:
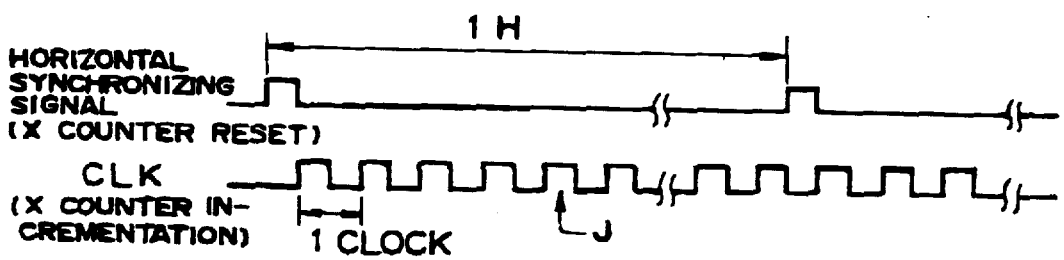

The operation of the position computation section 162 will now be described in detail with reference to FIGS. 5, 7A, 7B, and 7C. First of all, the HV separator 150 separates the horizontal and vertical synchronizing signals from the video signal, as shown in FIG. 7A. The vertical synchronizing signal is then input to a reset terminal R of the Y counter 168 and the horizontal synchronizing signal is input to a clock terminal C thereof, as shown in FIG. 5. The horizontal synchronizing signal is also input to a reset terminal R of the X counter 166 and a clock signal CLK generated by the clock generator 156 is input to a clock terminal C thereof. Note that the relationship between the horizontal synchronizing signal and the clock signal CLK is shown in FIG. 7B.

Figure 7C:
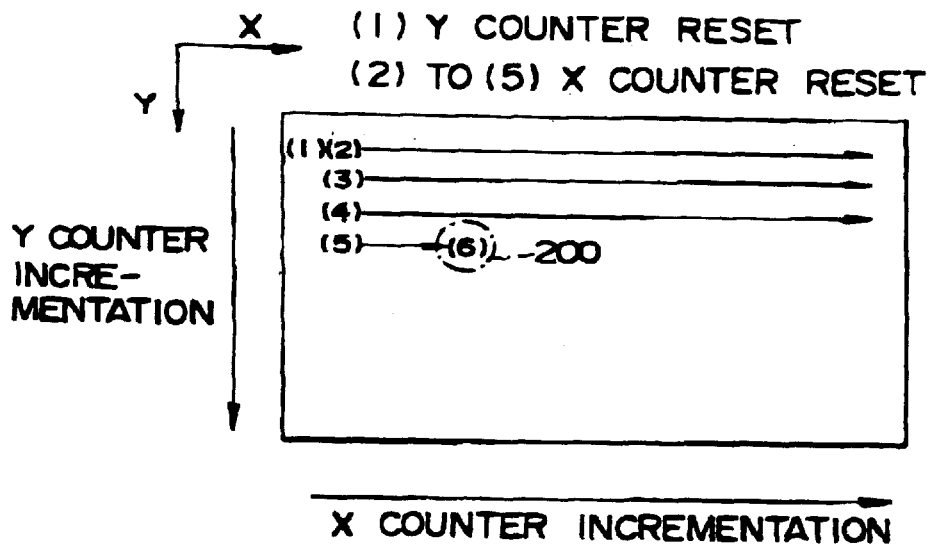

With this configuration, the Y counter 168 is reset at the point shown at (1) in FIG. 7C, in other words, at the initial point of one field period. It is incremented sequentially for each horizontal scan period (1H period). The X counter 166 is reset at the points shown at (2) to (5) in FIG. 7C, in other words, at the initial point of each 1H period. It is incremented sequentially at a suitable timing, such as at the rise of CLK.

When the player pulls the trigger 21 of the gun 20, a pulse from the photosensor 154 is detected at the time at which the raster scan reaches (6) in FIG. 7C. At that time, the position determination section 164 determines the X and Y coordinates corresponding to the counts of the X counter 166 and Y counter 168, based on those counts. This makes it possible to obtain the coordinates of the point (6), in other words, the coordinates of the aimed-at position. If the count of the Y counter 168 is 4, in the example shown in FIG. 7C, the Y coordinate of the point (6) is obtained uniquely, based on that count of 4. Similarly, since the X counter 166 is reset at the point (5), the count of the X counter 166 is the number of times that CLK has risen between the points (5) and (6). If, for example, the pulse from the photosensor 154 is detected at the position of J in FIG. 7B, the count of the X counter 166 is 5 and the X coordinate of the point (6) is obtained uniquely, based on that count of 5.

Thus this embodiment makes it possible to obtain more accurate coordinates for the aimed-at position, by using the vertical and horizontal scan signals separated by the HV separator 150.

Figure 8A:
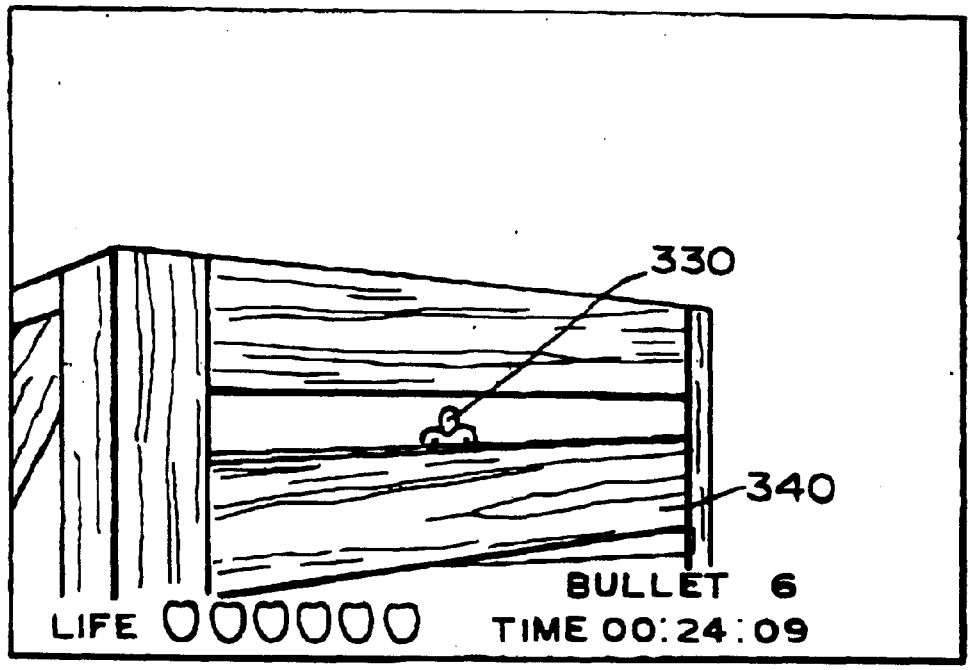
FIGS. 8A and 8B show examples of game images created by the game machine.
Figure 8B:
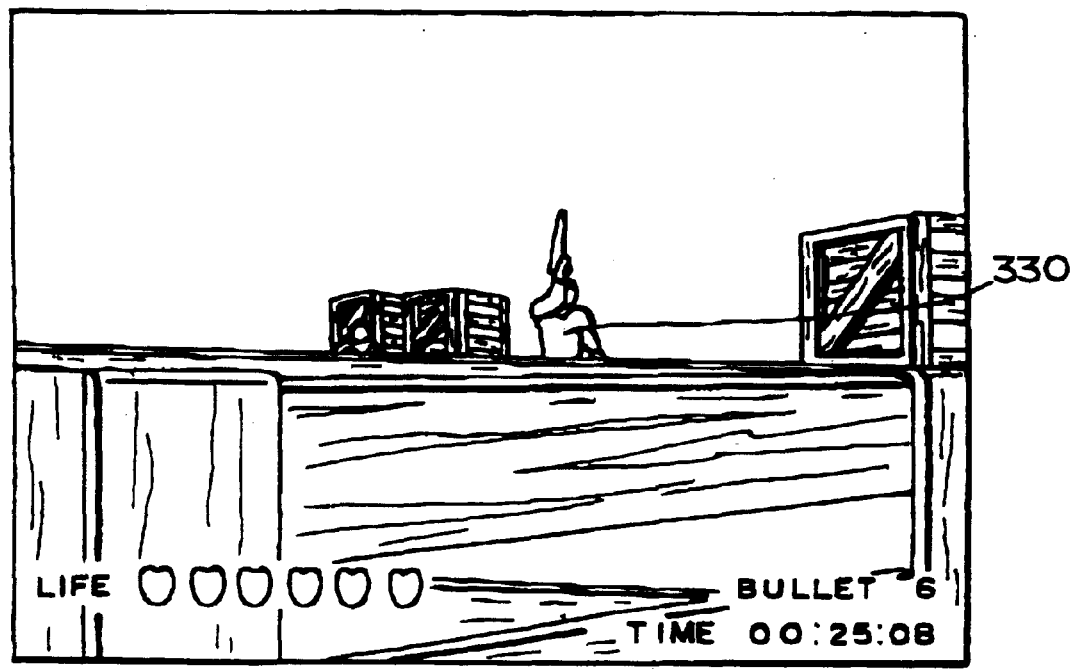
Figure 9A:
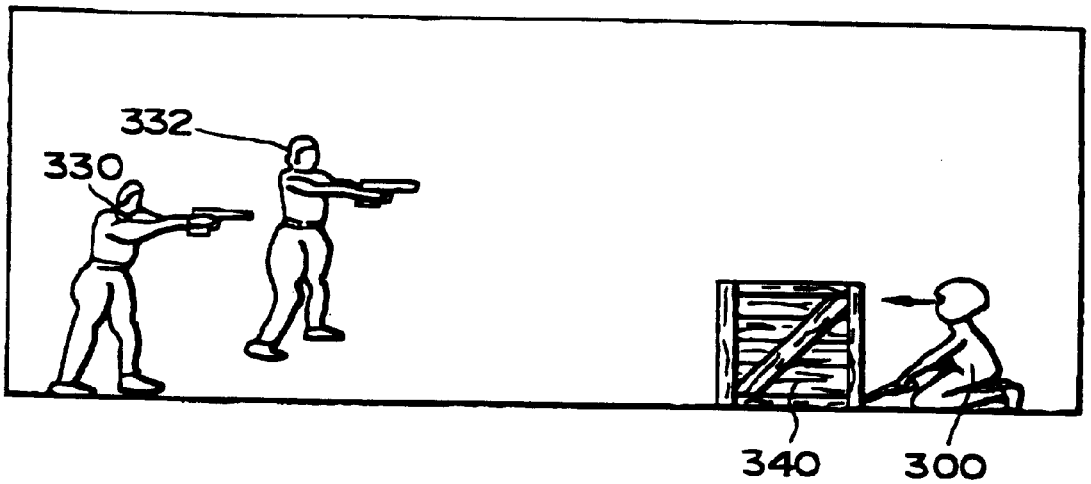
FIGS. 9A and 9B are views illustrating the switching between a defensive state and an attacking state.
Figure 9B:
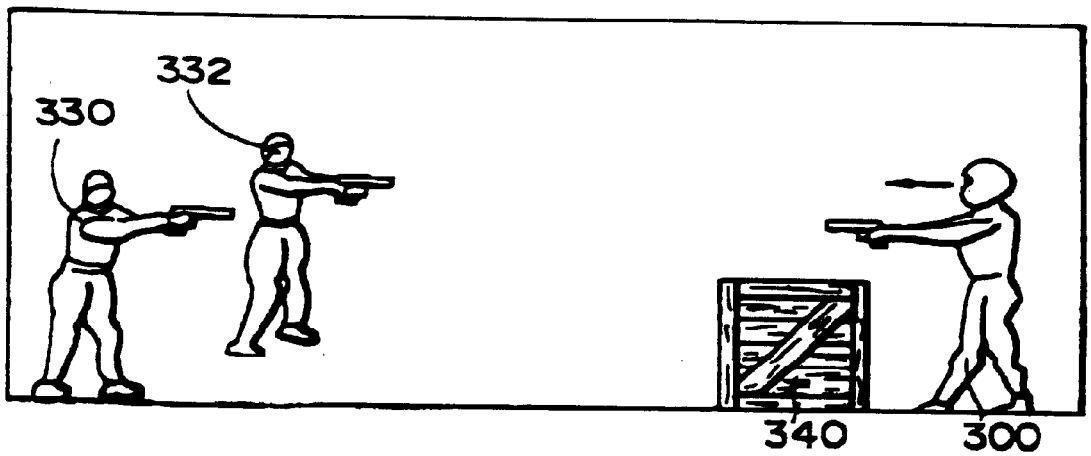
Figure 10A:
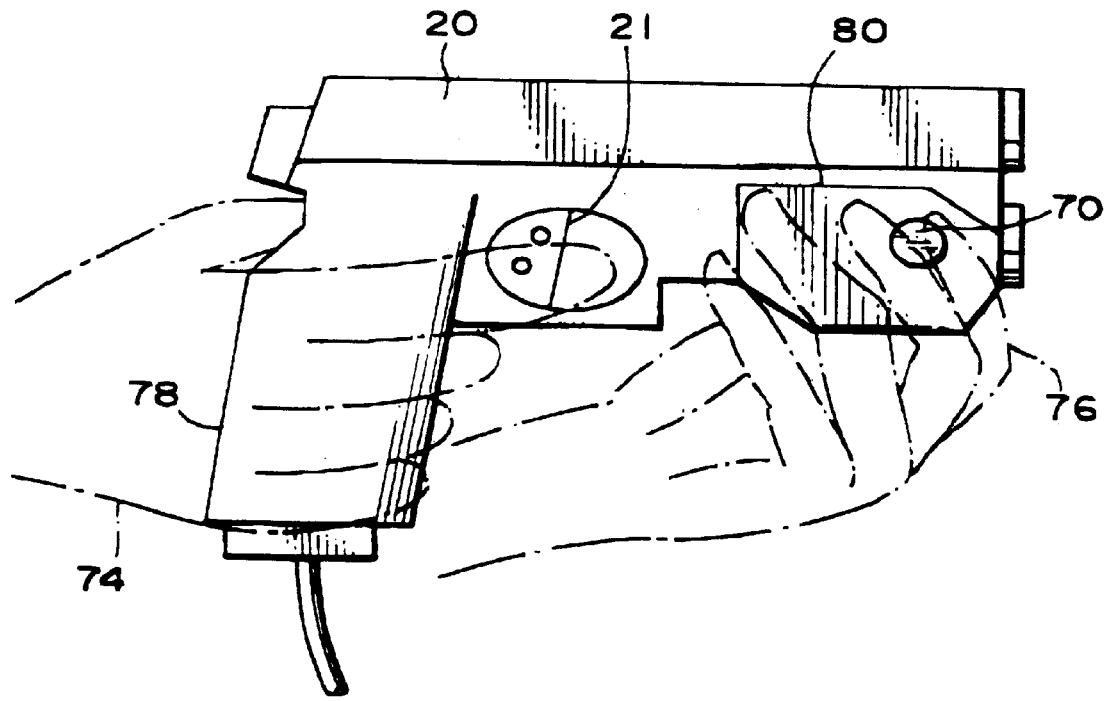
FIGS. 10A and 10B are views illustrating the operating buttons provided in the game controller.
Figure 10B:
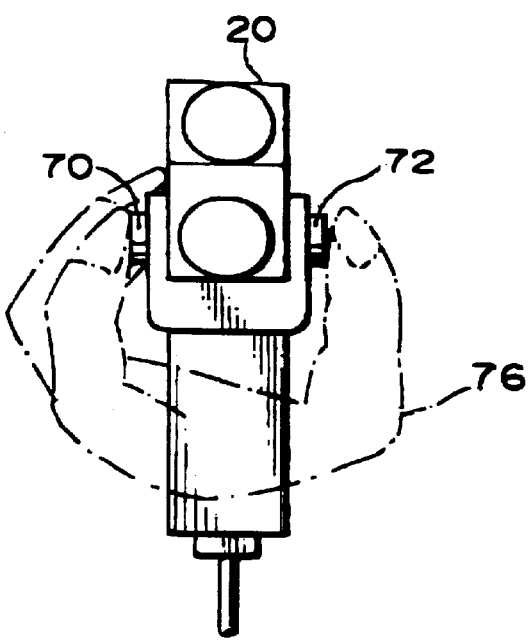

Note that examples of game images created by this embodiment are shown in Figs. BA and 88. The game image of FIG. 8A is a field-of-view image as seen by a virtual player 300 operated by the player, when in a defensive state, hidden behind a wooden crate 340 as shown in FIG. 9A. During this time, bullets from enemy game characters 330 and 332 are set to not hit the virtual player 300 who is shielded by the wooden crate 340. In other words, their hit probability is extremely low. The game image of FIG. 8B is a field-of-view image as seen by the virtual player 300 operated by the player, when standing and in an attacking state as shown in FIG. 9B. In this case, the bullets of the enemy game characters 330 and 332 are set so as to hit the virtual player 300 at a given hit rate. With this embodiment, the above described defensive state (FIGS. 8A and 9A) and attacking state (FIGS. 8B and 9B) are switched by pressing at least one of two operation buttons 70 and 72 shown in FIGS. 10A and 10B (where FIG. 10B is a view as seen from the muzzle direction of the gun 20).

The provision of these operation buttons 70 and 72 at the forward end of the gun makes it possible to achieve the effects described below. In other words, by grasping a first grip 78 of the gun 20 in a right hand 74 and a second grip 80 thereof in a left hand 76, the player can reduce shaking in the direction in which the gun 20 is pointing. The provision of the operation buttons 70 and 72 in the second grip 80 makes it possible to switch between the above described defensive and attacking states, start the game, and perform other game operations such as select a menu item, while still grasping the second grip 80 in the left hand. The provision of the operation buttons 70 and 72 at symmetrical positions enables the optimal button positioning, regardless of whether the player is right-handed of left-handed.

Figure 11:
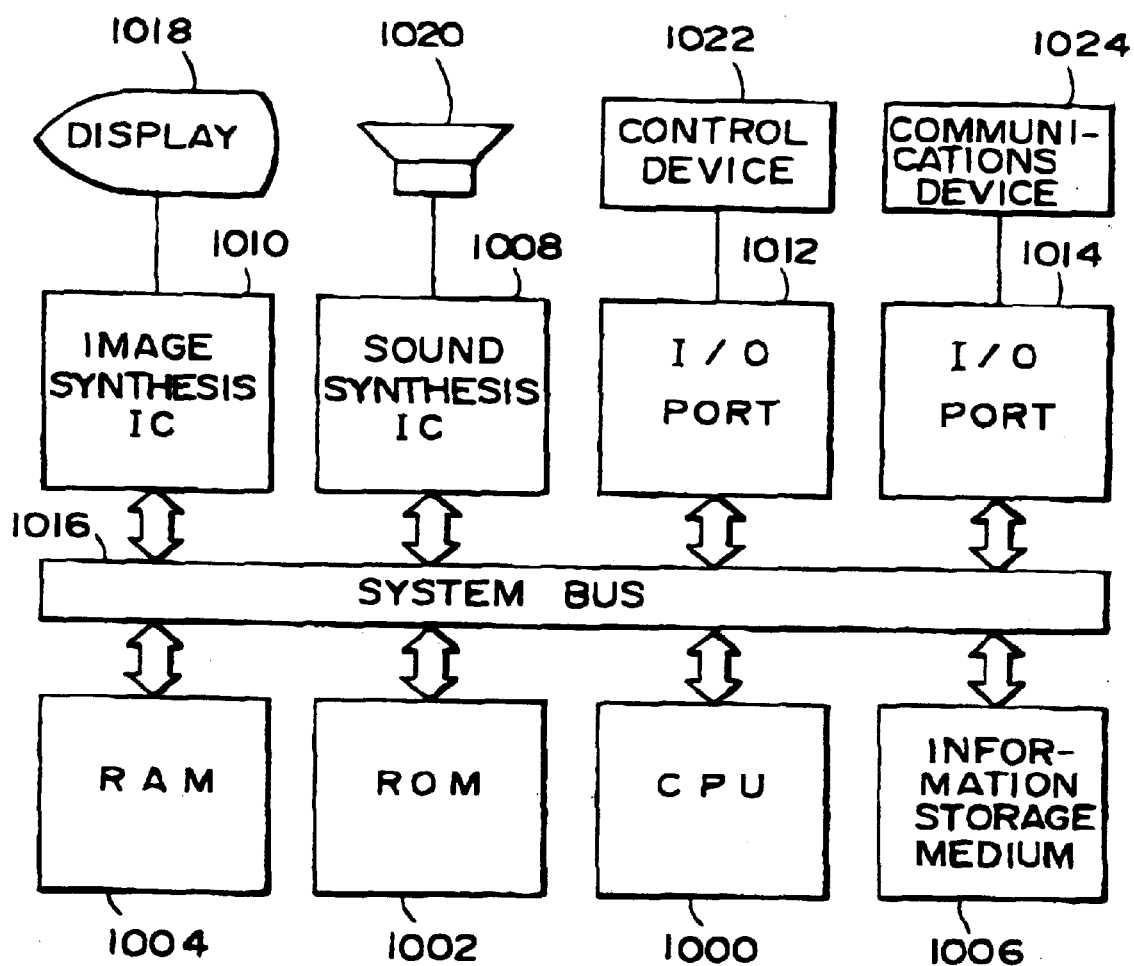
FIG. 11 shows an example of the hardware configuration of the game machine.

An example of the hardware configuration of this game machine will now be described with reference to FIG. 11. In the apparatus shown in this figure, a CPU 1000, ROM 1002, RAM 1004, information storage medium 1006, sound synthesis IC 1008, image synthesis IC 1010, and I/O ports 1012 and 1014 are connected together by a system bus 1016 so that data can be transferred therebetween. A display 1018 is connected to the image synthesis IC 1010, a speaker 1020 is connected to the sound synthesis IC 1008, a control device 1022 is connected to the I/O port 1012, and a communications device 1024 is connected to the I/O port 1014.

Image information or the like for representing a game program and display objects is mainly stored in the information storage medium 1006, and a CD-ROM, game cassette, IC card, MO disk, floppy disk, or memory is used therefor. Means such as a CD-ROM or game cassette could be used as an information storage medium for storing a game program for a domestic game machine, for example. Alternatively, memory such as ROM could be used for an arcade game machine, in which case the information storage medium 1006 is the ROM 1002.

The control device 1022 is equivalent to a game controller or operating panel and it is used as a device for inputting into the main unit of the device the effects of decisions made by the player as the game progresses.

The CPU 1000 controls the entire device and processes data in accordance with a game program stored in the information storage medium 1006, a system program stored in the ROM 1002 (including initialization information for the entire device), and signals input through the control device 1022. The RAM 1004 is a storage means that is used as a work space for the CPU 1000, and given details from the information storage medium 1006 or the ROM 1002, or the results of computations by the CPU 1000, are stored therein. A data configuration having the logical structure of table data necessary for calculating the aimed-at position and determining hits is built into this RAM or information storage medium.

The provision of the sound synthesis IC 1008 and the image synthesis IC 1010 in this type of device makes it possible to output game sounds and game images as required. The sound synthesis IC 1008 is an integrated circuit device that synthesizes game sounds such as sound effects and background music, based on information stored in the information storage medium 1006 or the ROM 1002, and the thus synthesized game sounds are output by the speaker 1020. The image synthesis IC 1010 is an integrated circuit device that synthesizes pixel information for output to the display 1018, based on image information that is sent from components such as the RAM 1004, the ROM 1002, and the information storage medium 1006. Note that a device called a head-mounted display (HMD) could be used as the display 1018.

The communications device 1024 transfers various types of information used within the game machine to and from external devices, and it is used to transfer given information in accordance with a game program when connected to another game machine, or transfer information such as a game program through a communications line.

The processing described with reference to FIGS. 4, 5, and 7 to 9B is implemented by components such as the information storage medium 1006 that contains a game program for performing processing such as that shown in the flowchart of FIG. 6, the CPU 1000 that operates in accordance with the game program, and the image synthesis IC 1010. Note that the processing performed by the image synthesis IC 1010 and the sound synthesis IC 1008 could be performed in a software manner by means such as the CPU 1000 or an ordinary DSP.

Figure 12A:
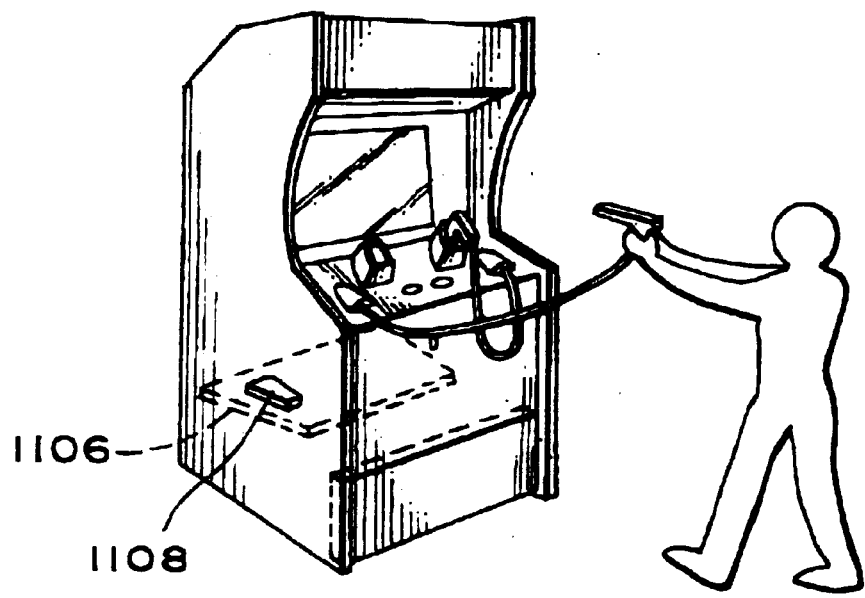
FIGS. 12A and 12B show devices to which this invention can be applied.

An example of this embodiment applied to an arcade game machine is shown in FIG. 12A. This embodiment is particularly advantageous when applied to a domestic game machine, but it can also be applied to an arcade game machine. Components such as a CPU, an image synthesis IC, and a sound synthesis IC are mounted on a system board 1106 built into the device. Information such as information for making game calculations based on the coordinates of an indicated position (aimed-at position) obtained from a game controller and information for creating a display image based on the results of game computations is stored in the information storage medium 1006. This information is hereinafter called stored information. This stored information comprises at least one type of information, such as program coding for performing the above described processing, image information, sound information, shape information for display objects, table data, list data, or player information.

If this embodiment is applied to a domestic game machine, the above described stored information is stored in an information storage medium that consists of a CD-ROM, a game cassette, an IC card, or the like.

Figure 12B:
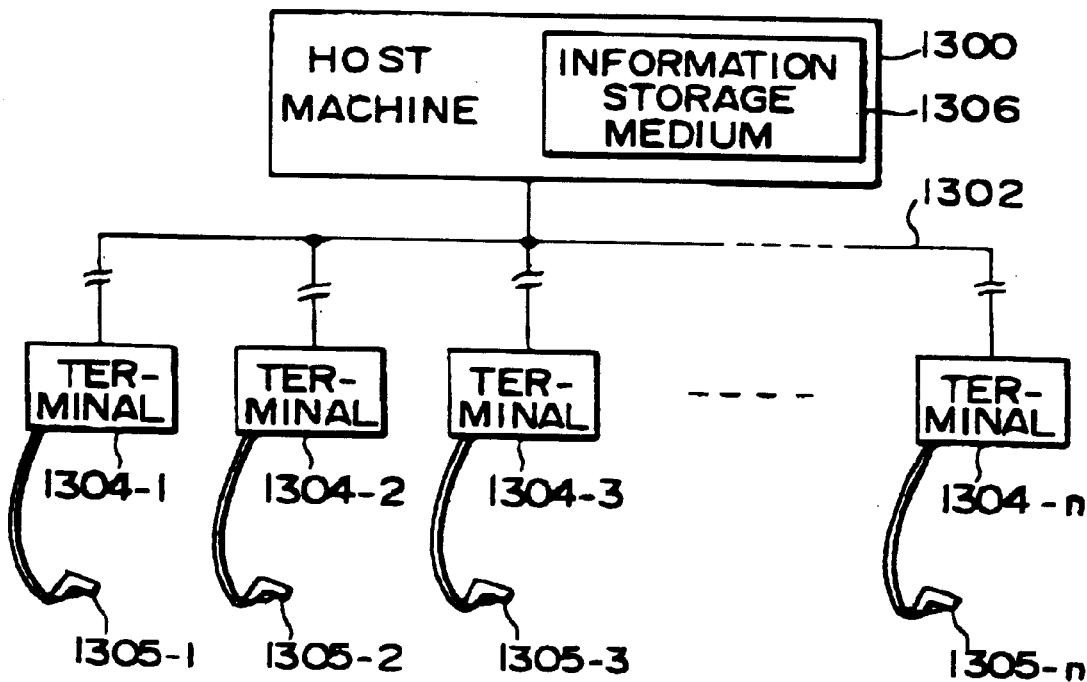

An example of this embodiment applied to a game machine is shown in FIG. 12B, where the game machine comprises a host machine 1300 and terminals 1304-1 to 1304-n connected to the host machine 1300 by communications lines 1302. In this case, game controllers 1305-1 to 1305-n are connected to the terminals 1304-1 to 1304-n by way of example. The above described stored information is stored in an information storage medium 1306 such as a magnetic disk, magnetic tape, or memory that can be controlled by the host machine 1300. Each of the terminals 1304-1 to 1304-n has a CPU, an image synthesis IC, and a sound synthesis IC, and, if game images and sounds can be synthesized thereby in a stand-alone manner, means such as a game program for synthesizing game images and sounds is transferred to the terminals 1304-1 to 1304-n from the host machine 1300. On the other hand, if they cannot be synthesized in a stand-alone manner, the host machine 1300 creates the game images and sounds then transfers them to the terminals 1304-1 to 1304-n for output by those terminals, Note that this invention is not limited to the above described embodiments and it can be implemented in various other ways.

Figure 13A:
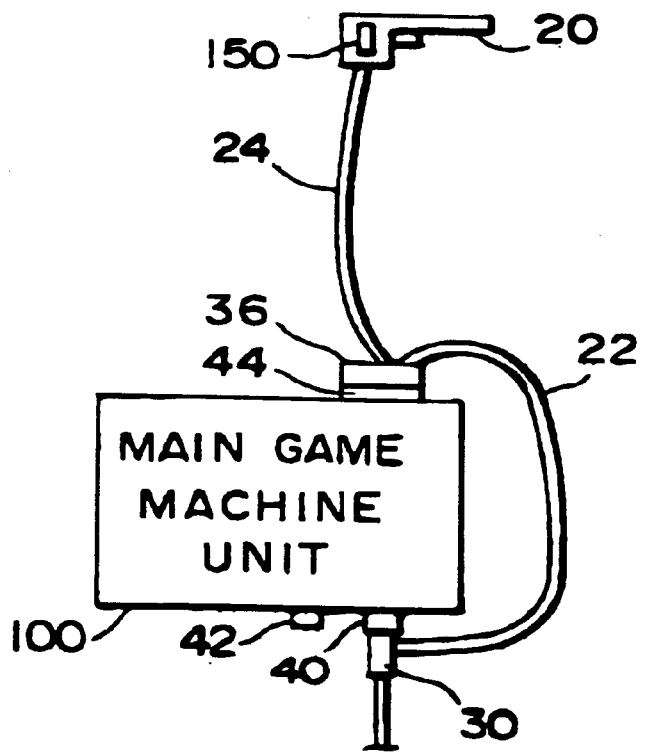
FIGS. 13A and 13B are views illustrating locations in which the separation means can be provided.
Figure 13B:
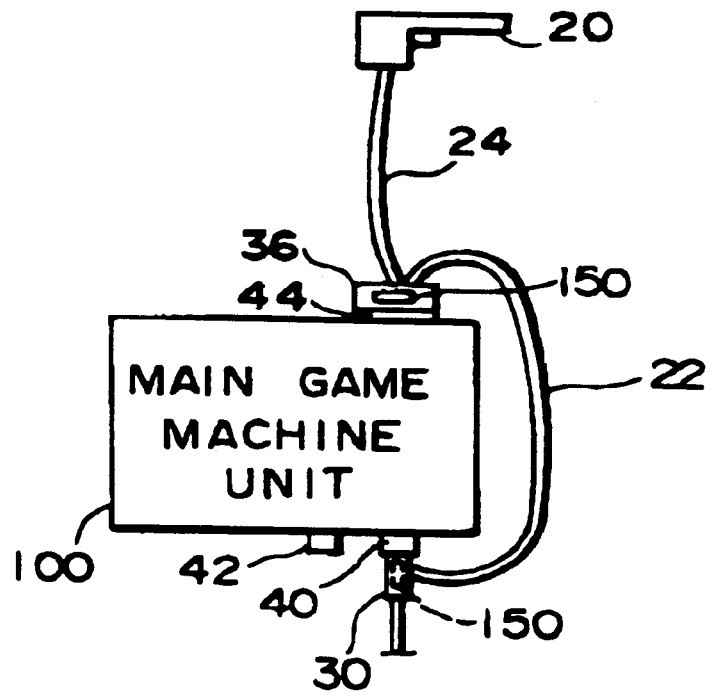

For example, the HV separator 150 which is a separation means is described in the above embodiments as being provided within the gun 20 which is an indicating means, as shown in FIG. 13A, but the present invention is not limited thereto and the HV separator 150 can equally well be provided in another location. The HV separator 150 could, for instance, be provided within the connector 36 or the connector 30, as shown in FIG. 13B. Since the gun 20 has a certain size, building the HV separator 150 into the gun 20 would not raise the problem that the gun 20 becomes too big. If, on the other hand, the HV separator 150 were to be provided within the connector 36 or 30, that connector 36 or 30 could become too big, raising a problem in that it becomes easy for the connector 36 or 30 to separate from the controller terminal 44. That is why it would be advantageous to provide the HV separator 150 within the gun 20. On the other hand, a configuration in which the HV separator 150 is provided within the connector 36 or 30, particularly within the connector 30, can prevent noise in the video signal and unwanted effects on external equipment caused by the video signal being propagated along cables. That is why it would be advantageous to provide the HV separator 150 within the connector 36 or 30.

The cables 22 and 24 were described in the above embodiments as being connected within the connector 36, but this invention is not limited thereto. If the configuration is such that the cables 22 and 24 are connected within the connector 36, a single cable can be used to connect the gun 20, making it convenient for the player, but the cable 22 could equally well be connected directly to the gun 20, as shown in FIG. 14A.

The video signal was described in the above embodiments as being transferred from the video output terminal 40 to the display device 15 through the connector 30, but this invention is not limited thereto. For example, the second video output terminal 42, which can output a video signal in the same manner, could be connected to the video input terminal 56 of the display device 15, as shown in FIG. 14B, or, conversely, the connector 30 could be connected to the second video output terminal 42 with the video input terminal 56 of the display device 15 being connected to the video output terminal 40.

The configuration and operation of the position computation section are also not limited to those described in these embodiments, and they can be implemented in various other ways.

Employing both of the horizontal and vertical synchronizing signals as synchronizing signals during the calculation of the coordinates of the indicated position is particularly effective for calculating the coordinates accurately, but one of these signals alone could equally well be used therefor.

The descriptions of these embodiments related to examples of how this invention could be applied to a shooting game, but this invention is not limited thereto and it can equally well be applied to various other games that make use of the game controller of this invention, such as puzzle games and racing games.

This invention is also not limited to domestic and arcade game machines; it can also be applied to various other game machines such as simulators, large-scale attractions in which many players can participate, personal computers, and system boards.

What is claimed is:

1. A game controller used in a game machine having a first terminal for outputting a video signal and a second terminal to which a control signal is input, said game controller comprising:

a first cable for transferring said video signal that is output from said first terminal;

a second cable for transferring said control signal that is input to said second terminal;

a separation means for separating a synchronizing signal from said video signal that is transferred from said first terminal of the game machine;

a pointing body capable of being directed in any desired direction;

an optical detection means provided in said pointing body, for detecting light from a position indicated by said pointing body on a screen of a display device; and position computation means for obtaining the coordinates of said indicated position, based on outputs from said separation means and said optical detection means.

2. The game controller as defined in claim 1, wherein said first cable transfers said video signal from said first terminal to said second cable; and wherein said second cable transfers said control signal input to said second terminal and said video signal received from said first cable.

3. The game controller as defined in claim 1, further comprising a connector connected to said first cable, wherein said connector comprises:

a third terminal formed to be connectable to said first terminal either directly or via a given cable, for transferring said video signal from said first terminal to said first cable; and a fourth terminal formed to be connectable to a video input terminal of said display device or one of the terminals of a connector of a second game controller, either directly or via a given cable, for transferring said video signal transferred from said first terminal through said third terminal to said video input terminal or said one of the terminals of said connector of said second game controller.

4. The game controller as defined in claim 2, further comprising a connector connected to said first cable, wherein said connector comprises:

a third terminal formed to be connectable to said first terminal either directly or via a given cable, for transferring said video signal from said first terminal to said first cable; and a fourth terminal formed to be connectable to a video input terminal of said display device or one of the terminals of a connector of a second game controller, either directly or via a given cable, for transferring said video signal transferred from said first terminal through said third terminal to said video input terminal or said one of the terminals of said connector of said second game controller.

5. The game controller as defined in claim 1, wherein said separation means is provided within said pointing body.

6. The game controller as defined in claim 2, wherein said separation means is provided within said pointing body.

7. The game controller as defined in claim 3, wherein said separation means is provided within said pointing body.

8. The game controller as defined in claim 4, wherein said separation means is provided within said pointing body.

9. The game controller as defined in claim 1, wherein said separation means is provided either in a connector linking said first cable to said first terminal or in a connector linking said second cable to said second terminal.

10. The game controller as defined in claim 2, wherein said separation means is provided either in a connector linking said first cable to said first terminal or in a connector linking said second cable to said second terminal.

11. The game controller as defined in claim 3, wherein said separation means is provided either in a connector linking said first cable to said first terminal or in a connector linking said second cable to said second terminal.

12. The game controller as defined in claim 4, wherein said separation means is provided either in a connector linking said first cable to said first terminal or in a connector linking said second cable to said second terminal.

13. The game controller as defined in claim 1, further comprising:

a tangible storage medium containing a computer program for operating a game machine that uses said game controller, wherein said computer program comprises:

means for performing game computations; based on coordinates of and indicated position that are obtained by said game controller; and means for synthesizing an image to be displayed on said display device, based on results of said game computations.

14. The game controller as defined in claim 2, further comprising:

a tangible storage medium containing a computer program for operating a game machine that uses said game controller, wherein said computer program comprises:

means for performing game computations; based on coordinates of and indicated position that are obtained by said game controller; and means for synthesizing an image to be displayed on said display device, based on results of said game computations.

15. The game controller as defined in claim 3, further comprising:

a tangible storage medium containing a computer program for operating a game machine that uses said game controller, wherein said computer program comprises:

means for performing game computations; based on coordinates of and indicated position that are obtained by said game controller; and means for synthesizing an image to be displayed on said display device, based on results of said game computations.

16. The game controller as defined in claim 4, further comprising:

a tangible storage medium containing a computer program for operating a game machine that uses said game controller, wherein said computer program comprises:

means for performing game computations; based on coordinates of and indicated position that are obtained by said game controller; and means for synthesizing an image to be displayed on said display device, based on results of said game computations.

* * * * *